Nov. 21, 1961
L. D. HINKLEY
3,009,494
STUMP REDUCER
Filed June 4, 1959
2 Sheets-Sheet 1
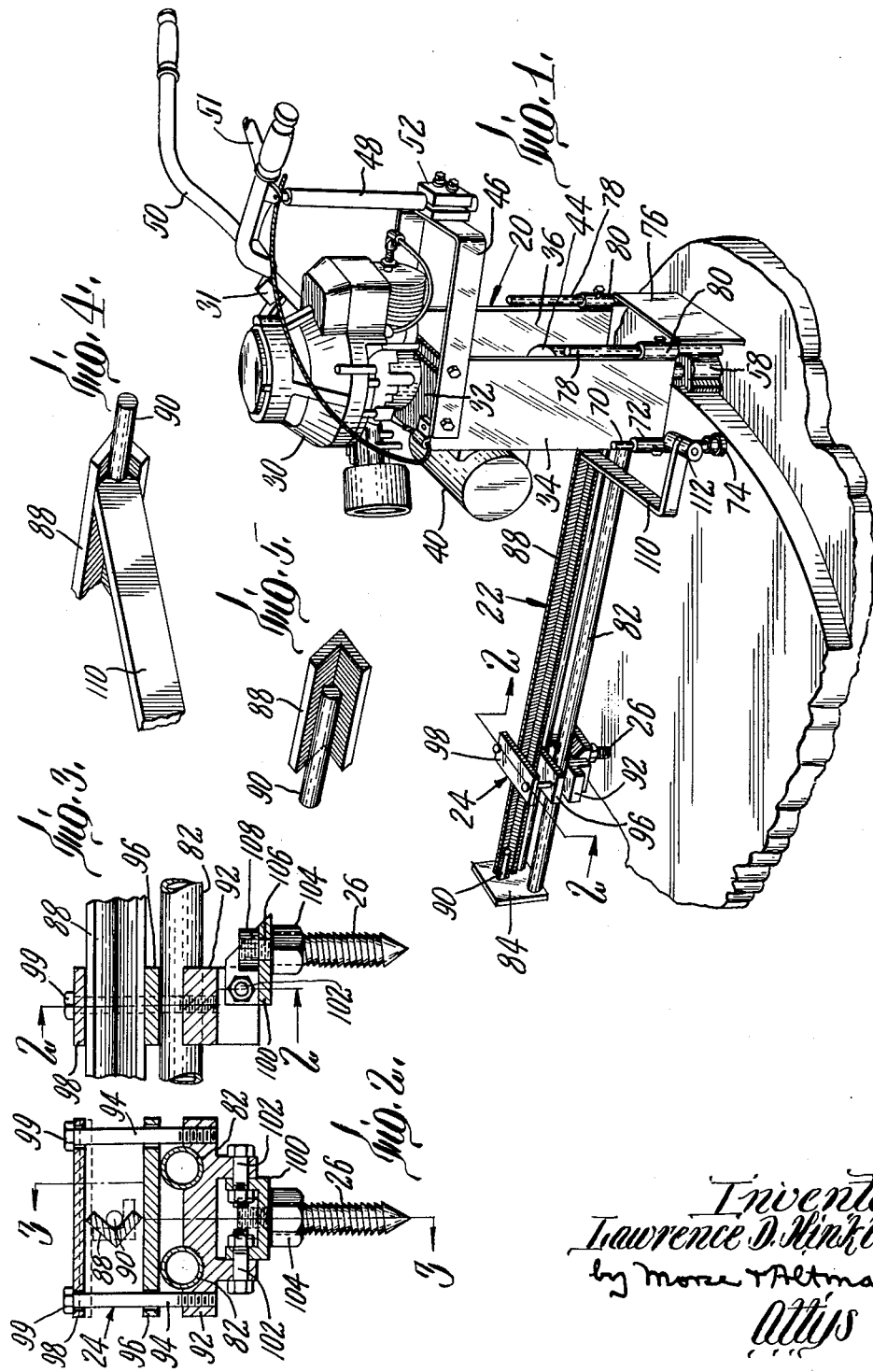
Inventor
Lawrence D. Hinkley
by Morse & Altman
Att'ys

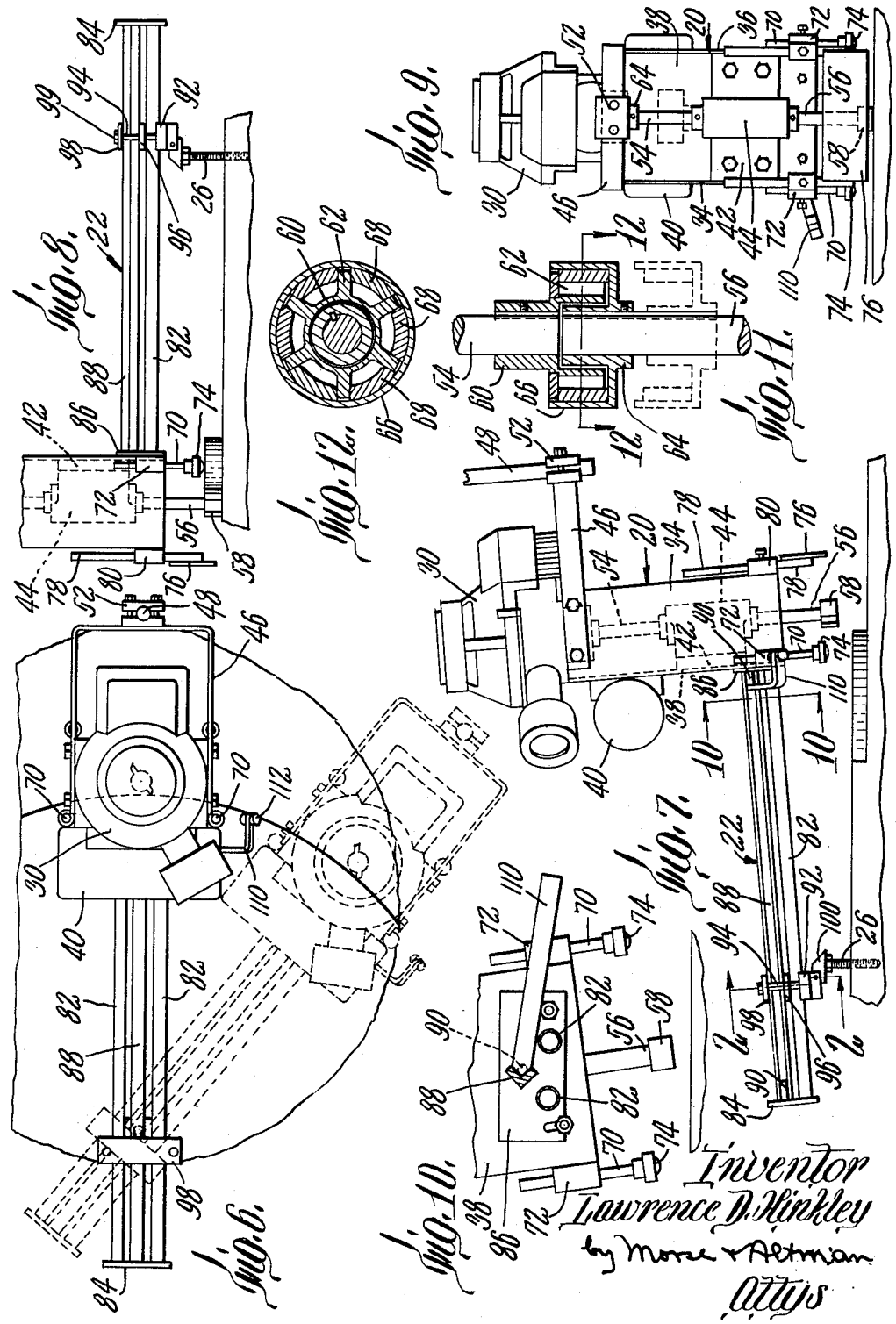

United States Patent Office 3,009,494
Patented Nov. 21, 1961

3,009,494
STUMP REDUCER
Lawrence D. Hinkley, 22 Bowker St., Greenfield, Mass.
Filed June 4, 1959, Ser. No. 818,091
1 Claim. (Cl. 144—2)

This invention relates to trimming tree stumps down to a level at or below the ground level. It is an object of the invention to provide apparatus for this purpose which operates quickly and effectively, which is easy to control, and which is constructed to avoid possible injury to the operator.

Successive layers of the stump are removed by a cutter which is rotated by a vertical shaft on the upper end of which is mounted a motor. The motor and cutter assembly swings around a pivot which is screwed into the top face of the stump.

For a more complete understanding of the invention, reference may be had to the following description thereof, and to the drawings, of which—

FIGURE 1 is a perspective view of an embodiment of the invention in operating position on a stump;

FIGURE 2 is a section on the lines 2—2 of FIGURES 1 and 3;

FIGURE 3 is a section on the line 3—3 of FIGURE 2;

FIGURES 4 and 5 are fragmentary perspective views of parts of the clamp actuating mechanism shown in FIGURE 1, but on a larger scale;

FIGURE 6 is a plan view of the mechanism illustrated in FIGURE 1;

FIGURE 7 is a side elevation of the same;

FIGURE 8 is a fragmentary side elevation of the mechanism in reversed position to complete the cutting of a layer of the stump;

FIGURE 9 is an end elevation of the mechanism;

FIGURE 10 is a fragmentary rear view of the motor and cutter assembly as viewed on the line 10—10 of FIGURE 7, the assembly being tilted;

FIGURE 11 is a fragmentary elevation of the drive shaft, showing a centrifugal clutch thereon in section; and FIGURE 12 is a section on the line 12—12 of FIGURE 11;

Apparatus embodying the invention, as illustrated in FIGURE 1, comprises a motor and cutter assembly 20 from which projects a horizontal arm 22 adjustably connected by a clamp 24 and a universal joint hereinafter described, to a pivot element 26 which is adapted to be driven into a stump and about which the motor and cutter assembly swings when in use.

The motor 30, which may be a prime mover of any convenient kind such as an internal combustion engine which is started by pulling on a cord (not shown) to which a handle 31 is attached is mounted on a frame comprising a top plate 32, side walls 34 and 36, and a rear wall 38. A fuel tank 40 may be mounted on the rear wall 38. Also secured to the rear wall 38 is plate 42 which carries a pillow block bearing 44. At the upper part of the frame is mounted a bracket 46 to which is adjustably secured by means of a clamp block 52, the stem 48 of a pair of bicycle handle-bars 50.

The motor 30 is connected to the upper section of a vertical shaft which has separate upper and lower sections 54 and 56 (FIGURE 11). A cutter 58 is mounted at the lower end of the lower shaft section 56. The two sections are connected by a centrifugal clutch of any convenient kind. As shown, the clutch comprises an upper member 60 which is keyed to the motor shaft section 54 and has a number of radial vanes 62. The lower member 64 of the clutch is keyed to the cutter shaft section 56 and has a cylindrical wall 66 just outside of the outer edges of the radial vanes 62. Fitted against the wall 66 between successive vanes 62 are loose lugs 68 which are pushed in a circular path by the vanes when the motor shaft 54 is rotating and are centrifugally pressed against the wall 66 to rotate the clutch member 64 and the cutter shaft section 56 by fractional engagement. The motor and cutter assembly are supported by two legs 70 which are adjustably clamped in brackets 72 mounted respectively on the side walls 34 and 36. Each leg 70 has a ball foot 74 at its lower end on which the assembly rolls when moved laterally. Adjustment of the legs 70 determines the depth of cut made by the cutter 58, as indicated in FIGURE 1.

To protect the operator from the whirling cutter, a guard plate 76 is adjustably mounted on the assembly frame by a pair of rods 78 which extend upward from the plate and are clamped in brackets 80 on the side walls 34 and 36.

The arm 22, which projects horizontally to the rear from the motor and cutter assembly, comprises two parallel rods or tubes 82 the ends of which are permanently secured to end plates 84 and 86. Rockably mounted between these plates is a cam member 88 consisting of a length of angle iron to the ends of which are welded short rods 90. These rods extend through holes in the plates, 84 and 86 and serve as journals on which the cam member 88 rocks.

The tubes 82 of the arm 22 are releasably gripped and supported by a clamp device illustrated in FIGURES 2 and 3. This device comprises a base block 92 preferably having in its top face a pair of grooves in which the tubes 82 fit. Two bolts 94 extend up from the end portions of the block 92 and pass through holes in two plates 96 and 98, which are freely movable up and down on the bolts, the upward movement of the plate 98 being limited by the heads 99 of the bolts. The cam member 88 extends through the clamp device between the bolts 94 and between the plates 96 and 98. As indicated in FIGURE 2, the spacing is such that when the cam member 88 is rocked to the angular position indicated, it cams the plates 96 and 98 apart so that the lower plate 96 is pressed firmly against the tubes 82 to grip them. When the cam member 88 is rocked to the position indicated by broken lines, the clamp is released and the arm 22 is free to slide through the clamp 24 to move the motor and cutter assembly toward or from the pivot 26.

The universal joint by which the arm 22 is connected to the pivot screw 26 comprises the base block 92 of the clamp which is rockably connected to a bracket 100 by horizontally aligned bolts 102. These bolts are horizontal pivots for the clamp. The bracket 100 is rotatable about the axis of the pivot screw 26 which has a hexagonal head 104 immediately below the bracket 100 and a top extension 106 which passes loosely through a hole in the bracket and has a retaining nut 108 on its upper end. The forward end plate 86 of the arm 22 is bolted or otherwise secured to the rear wall 38 of the assembly frame so that the assembly can be swung about the pivot 26 in a horizontal plane and can be swung up and down in a vertical plane about the axis of the bolts 102. This provides two degrees of freedom for the cutter assembly but maintains the cutter at a constant distance from the pivot 26 as long as the clamp 24 is tight.

For quick and convenient operation of the clamp a lever 110 is secured to the cam member 88. This lever extends to a convenient location beside the assembly frame where its free end may be kicked up or down to release or set the clamp by rocking the member 88. A pedal 112 may be provided for this purpose at the free end of the lever 110.

When a stump is to be reduced, a hole of suitable diameter to receive the screw 26 is drilled into the stump near the periphery of its top face. The screw 26 is then screwed into the hole by applying a wrench to the hexagonal head 104 of the screw. The assembly 20 is then moved to the peripheral portion of the stump face furthest from the pivot 26, and cutting is begun. The depth of cut is regulated by adjustment of the supporting legs 20. During each cutting pass, the assembly is swung about the pivot 26. After each such pass, the lever 110 is kicked to release the clamp 24, the assembly is moved toward the pivot a distance less than the diameter of the cutter 58, and the lever 110 is kicked down to clamp the arm 22. When the assembly has progressed until it is near the pivot 26, the pivot screw is removed from the stump and inserted in a new hole drilled at a point remote from the first hole, as indicated in FIGURE 8. The remaining portion of the top layer is cut away and cutting is then started on the layer next below.

I claim:

Apparatus for reducing stumps, comprising an upright frame, a motor mounted on top of said frame, a vertical shaft extending downward from said motor, a rotary cutter mounted at the lower end of said shaft below said frame, a centrifugal clutch on said shaft between said motor and said cutter, handle bars adjustably secured to said frame and extending forward therefrom, a guard plate carried by said frame in front of said cutter, a pair of parallel tubes secured at one end to said frame near the lower end thereof and extending rearward therefrom, a cross-head secured to the other ends of said arms, a clamping device slidable on said tubes, means for operating said device to grip said tubes, said operating means comprising an angle iron rockably supported by said frame and cross-head, a lever on said angle iron near said frame operable to rock said angle iron to clamp and release said device, a pivot element adapted to be driven into a stump, and a universal joint connecting said pivot element and clamping device.

References Cited in the file of this patent

UNITED STATES PATENTS

| | | |
|---|---|---|
| 1,083,160 | Villinger | Dec. 30, 1913 |
| 1,116,158 | Swain et al. | Nov. 3, 1914 |
| 1,273,043 | Densmore | July 16, 1918 |
| 2,671,478 | Anderson et al. | Mar. 9, 1954 |
| 2,785,424 | McMaster et al. | Mar. 19, 1957 |
| 2,825,370 | Fieber | Mar. 4, 1958 |